(12) United States Patent
Wilson

(10) Patent No.: US 6,374,883 B1
(45) Date of Patent: Apr. 23, 2002

(54) AIRCRAFT TIRE WITH TWO AQUACHANNELS

(75) Inventor: Allen Richard Wilson, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/574,833

(22) Filed: May 19, 2000

(51) Int. Cl.[7] .................. B60C 9/18; B60C 11/04; B60C 101/00; B60C 125/00
(52) U.S. Cl. .................. 152/209.26; 152/526; 152/901
(58) Field of Search .................. 152/209–26, 901, 152/526

(56) References Cited

U.S. PATENT DOCUMENTS

| | | | |
|---|---|---|---|
| 4,044,810 A | * | 8/1977 | Taniguchi et al. |
| 4,832,103 A | * | 5/1989 | Slivka et al. |
| 4,865,098 A | * | 9/1989 | Majerus |
| 5,016,838 A | * | 5/1991 | Brooks et al. |
| 5,222,537 A | * | 6/1993 | Saito et al. ............ 152/209.26 |
| 5,337,815 A | * | 8/1994 | Graas ................... 152/209.26 |
| 5,385,190 A | * | 1/1995 | Assaad et al. ............. 152/526 |
| 5,476,129 A | * | 12/1995 | Shoyama .................. 152/454 |
| 5,954,107 A | * | 9/1999 | Kuze et al. ........... 152/209.26 |

FOREIGN PATENT DOCUMENTS

| | | | |
|---|---|---|---|
| EP | 448901 | * | 10/1991 |
| EP | 463273 | * | 1/1992 |
| GB | 2221877 | * | 2/1990 |
| JP | 63-235106 | * | 9/1988 |
| JP | 11-59132 | * | 3/1999 |

OTHER PUBLICATIONS

Horne et al, "Influence of Tire Tread Pattern and Runway Surface Condition on Braking Friction and Rolling Resistance of a Modern Aircraft Tire", NASA Technical Note, pp. 30–34, 40–55, Sep. 1962.*

* cited by examiner

Primary Examiner—Steven D. Maki
(74) Attorney, Agent, or Firm—David E Wheeler

(57) ABSTRACT

An aircraft tire with two aquachannels (14) provides a wide band area (17) in the central portion of the tread for improved wear properties. The aquachannels each comprise 4.5% to 7% of the tread width based on the design tread width of the tire.

4 Claims, 4 Drawing Sheets

AIRCRAFT TIRE WITH TWO AQUACHANNELS

FIELD OF THE INVENTION

The invention relates to pneumatic tires which have a smooth tread pattern except for the presence of aquachannels.

BACKGROUND OF THE INVENTION

It is generally recognized in the tire art that tires suitable for use on aircraft must be capable of operating under conditions of very high speeds and large loads as compared to tires used on automobiles, busses, trucks or similar earthbound vehicles. As used herein and in the claims, a tire is "suitable for use on an aircraft" if the tire is of a size and load range, or ply rating, specified in either the *YEARBOOK OF THE TIRE AND RIM ASSOCIATION*, or the *YEARBOOK OF THE EUROPEAN TIRE AND RIM TECHNICAL ORGANIZATION*, for the year in which the tire is manufactured, or in the current U.S.A. military specification "MIL-PRF-5041".

In the prior art, nylon is a preferred reinforcement material for aircraft tires because it is forgiving and is not as subject to fatigue as other available materials. Nylon reinforcement, however, does not have superior strength, and for heavy aircraft, many plies of nylon are needed in the construction of an aircraft tire.

It is also known that in view of its high modulus (80,000 MPa) and dimensional stability, aramid is particularly advantageous as a reinforcing element in high-speed tires. As is used herein, "aramid" is understood to mean a manufactured fiber in which the fiber-forming substance is generally recognized as a long, chain synthetic aromatic polyamide in which at least 85% of the amide linkages are attached directly to two aromatic rings. Representative of an aramid or aromatic polyamide is a poly p-phenyleneterephtalamide.

Aircraft tires are sometimes made with smooth tread, i.e., the tread has no grooves or sipes. Usually, aircraft tires are made with circumferential grooves, i.e., the tread is smooth except for the presence of the circumferential grooves. In a common aircraft design, the tread has four (4) circumferential grooves which provide a void area in the footprint of about 15 percent. The circumferential grooves help prevent hydroplaning when an aircraft using such tires lands and takes off, and to some extent, helps prevent sideways skidding of the aircraft.

It is a continuing goal in the art to improve the wear properties, skid properties and other performance properties of aircraft tires.

SUMMARY OF THE INVENTION

A pneumatic tire of the invention comprises at least one pair of annular beads, at least one carcass ply wrapped around the beads, tread disposed over the at least one carcass ply in a crown area of the tire, and sidewalls disposed between the tread and the beads. The tread has a depth of 0.20 to 0.50 inch. Two aquachannels, each having a width comprising 4.5% to 7% of the tread width, and a depth comprising 63% to 83% of the tread depth are disposed in the tread. The width of the central portion of the tread, between the aquachannels, comprises 90% to 110% of the total width of the two shoulder tread portions.

An illustrated embodiment of the fire is made with four nylon carcass plies and two aramid breakers.

Specific fire sizes that have been constructed for initial testing are sizes 5.00-5, 6.00-6, 15×6.0-6, 6.50-8, 6.50-10, 22×6.75-10, 7.00-6, and 8.50-10.

The tire of the invention has load specifications and inflation specifications for use on an aircraft.

Definitions

"Bead" means that part of the tire comprising an annular tensile member wrapped by ply cords and shaped, with or without other reinforcement elements such as flippers, chippers, apexes, toe guards and chafers, to fit the design rim.

"Carcass" means the tire structure apart from the belt structure, tread, undertread, and sidewall rubber over the plies, but including the beads.

"Crown" refers to the circumferentially outermost portion of the carcass substantially within the width limits of the tread.

"Equatorial plane (EP)" means the plane perpendicular to the tire's axis of rotation and passing through the center of its tread.

"Footprint" means the contact patch or area of contact of the tire tread with a flat surface at zero speed and under design load and pressure.

"Footprint Net-to-gross" refers to the actual footprint of a deflected tire and is the ratio of the ground-contacting surface area of the tread to the total tread footprint area including the groove void area.

"Groove" means an elongated void area in a tread that may extend circumferentially or laterally about the tread in a straight, curved, or zig-zag manner. Grooves ordinarily remain open in the tire footprint.

"Sipes" refer to small slots molded into ribs of tire that subdivides the tread surface and improves traction characteristics. Sipes tend to close completely in a fire footprint.

"Normal load and inflation pressure" refers to the specific design inflation pressure and load assigned by the appropriate standards organization for the design rim and service condition for a tire of specific size. Examples of standards are the *Tire and Rim Association Manual* and the *European Tire and Rim Technical Organization*.

"Pneumatic tire" means a laminated mechanical device of generally toroidal shape (usually an open-torus) having beads and a tread and made of rubber, chemicals, fabric and steel or other materials. When mounted on the wheel of a motor vehicle, the tire, through its tread, provides traction and contains the fluid that sustains the vehicle load.

"Radial" and "radially" are used to mean directions radially toward or away from the axis of rotation of the tire.

"Shoulder" refers to the upper portion of sidewall just below the tread edge.

"Sidewall" means that portion of a tire between the tread and the bead.

"Tread" means a molded rubber component which, when bonded to a tire casing, includes that portion of the tire that comes into contact with the road when the tire is normally inflated and under normal load.

"Tread width" means the arc length of the road contacting tread surface in the axial direction, that is, in a plane parallel to the axis of rotation of the tire.

"Turn-up ply" refers to an end of a carcass ply that wraps around one bead only.

DETAILED DESCRIPTION OF THE INVENTION

Figure 1:
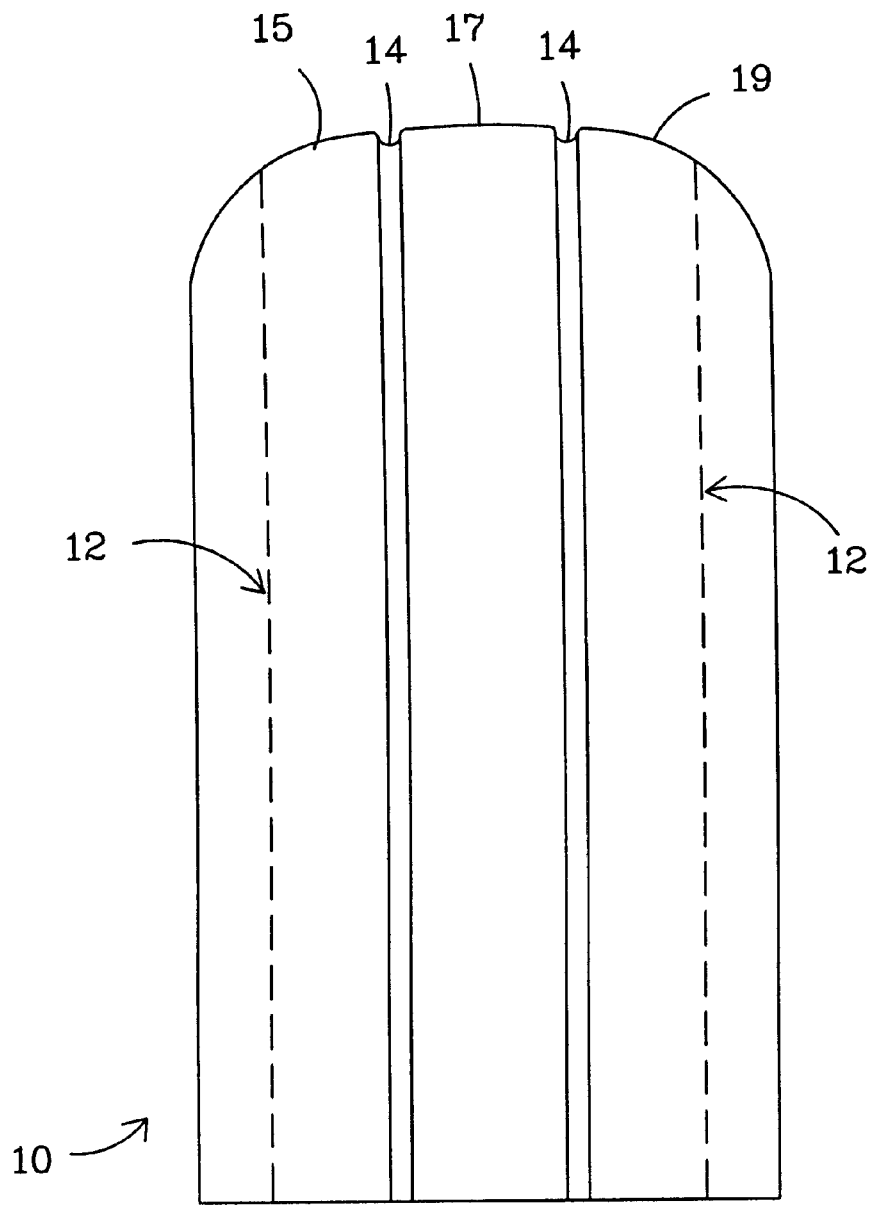
FIG. 1 illustrates a frontal view of a portion of the tread of the aircraft tire of the invention.
Figure 2:
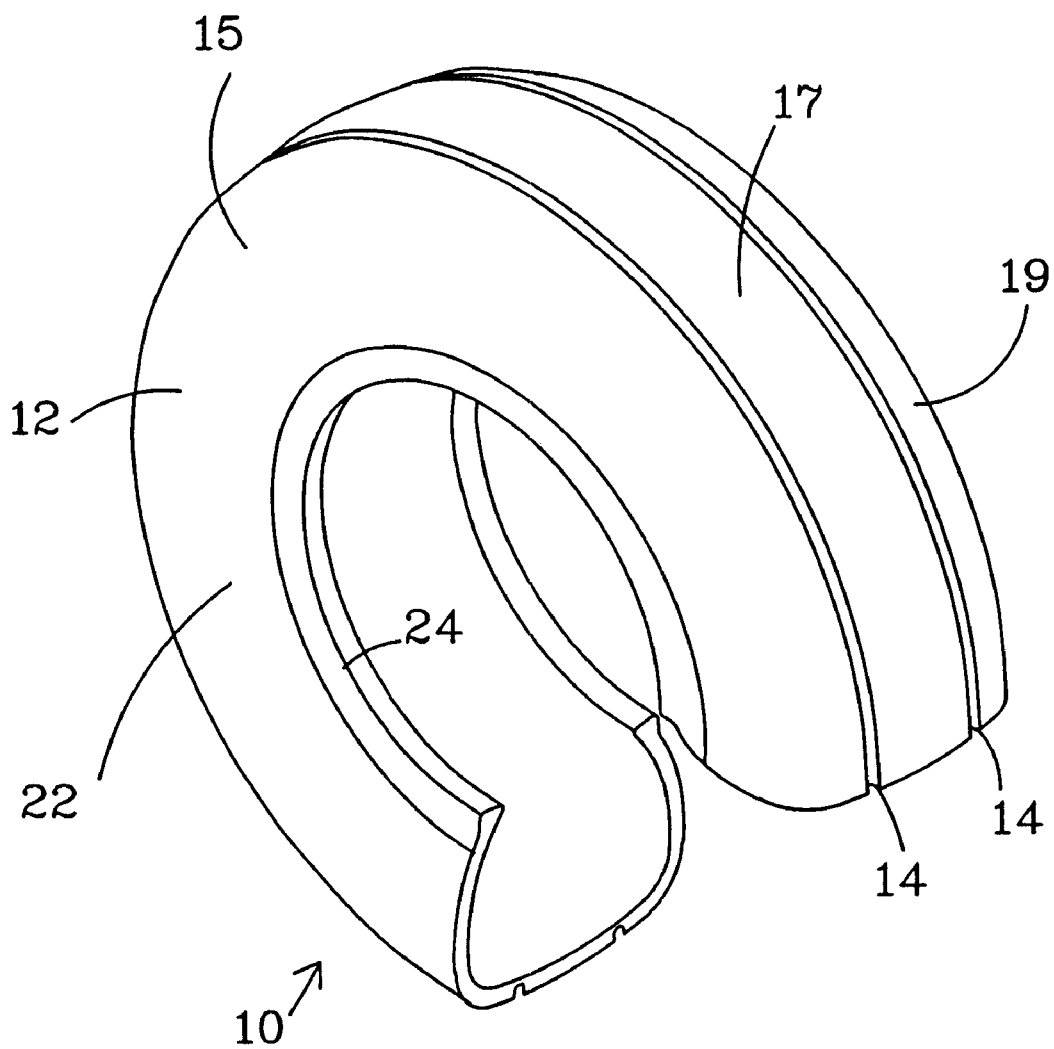
FIG. 2 illustrates a perspective view of a portion of the aircraft tire of the invention.
Figure 3:
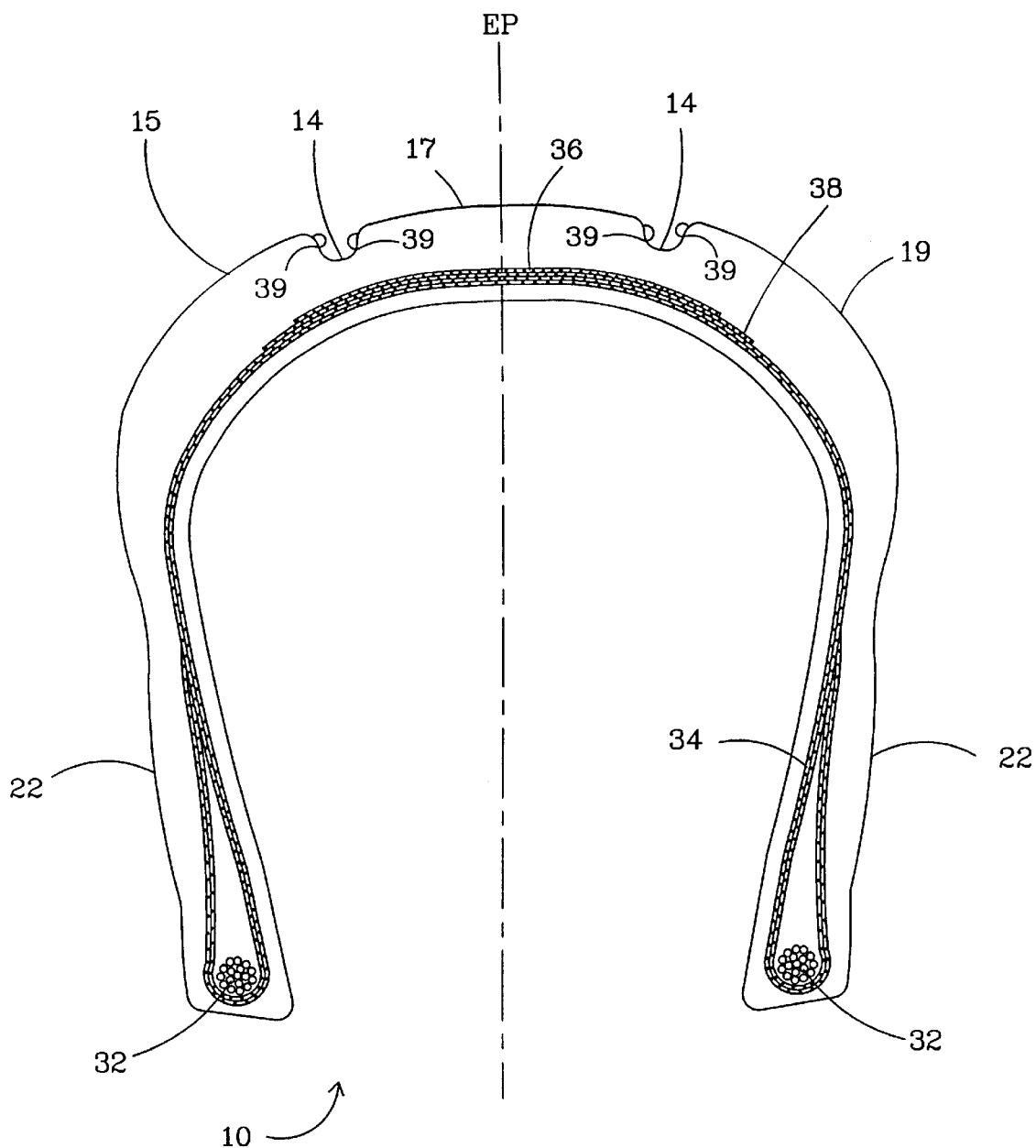
FIG. 3 illustrates a cross-section of radial carcass ply embodiment of the aircraft tire of the invention.

With reference now to FIGS. 1–3, the illustrated tire (10) of the invention has a tread (12), which contains two circumferential aquachannels (14). The aquachannels (14) divide the tread (12) into three land portions (15, 17, 19). Central portion (17) of the tread has a width which comprises 90 percent to 110 percent of the total width of the two shoulder tread portions (15, 19).

The tread of the tire has a depth of 0.20 to 0.50 inch. The aquachannels (14) each have a width comprising 4.5 percent to 7 percent of the tread width as measured by the design width of the tread, and have a depth comprising 63 percent to 83 percent of the tread depth. The width and depth of the aquachannels (14) provide a void volume in the tread (12) which is equal to or greater than that seen in prior art tires.

In a footprint of the tire of the invention, aquachannels (14) comprise a 100% percent of the void area in the footprint.

Those skilled in the art will recognize that aircraft tires are made with up to 4 pairs of beads and up to 22 carcass plies and 0 to 12 belt plies depending on their intended use.

In the illustrated radial ply embodiment (FIG. 3), two cut belts (36, 38) reinforced with high modulus cords, having an end count of 14 to 22 e.p.i., and a cord angle of 12° to 22° with respect to the EP of the tire are used.

In the illustrated bias ply embodiment (FIG. 4), two cut belts (46, 48) reinforced with high modulus cords, having an end count of 14 to 22 e.p.i., and a cord angle of 20° to 40° with respect to the EP of the tire are used.

In the illustrated embodiment, aramid cords coated with an RFL adhesive and an end count of 20 e.p.i. were used in the belts.

The high modulus cords used in the invention may be, for example, aramid or steel, or any other high modulus material having similar properties, or a combination of such high modulus materials. Such reinforcement cords can comprise any suitable denier and any suitable twist. Such high modulus cords may be treated to increase their bond strength to rubber, and aramid reinforcement cords may be coated with an adhesive or an adhesive/epoxy combination. The high modulus cords used in the illustrated embodiment are 1500/3 denier aramid and have a twist of 6.9/6.9.

As used herein, the angle of reinforcement cords in the tire will be given an absolute value, regardless of their general direction of orientation, it being understood that in most, but not all cut belt constructions, reinforcement cords in alternate cut belts are oriented in the opposite direction with respect to the EP of the tire. In the illustrated embodiment reinforcement cords in alternate cut belts have the opposite angle of orientation.

The tires in the illustrated embodiment are made for use as the main tire on General Utility Aircraft (GUA), such as the Cessna 172.

With reference specified now to FIG. 3, an illustrated radial tire of the invention is made using a pair of beads (32) around which is wrapped two nylon carcass plies (34). Disposed over the carcass plies (34), in the crown area of the tire, are aramid belts (36, 38). Carcass plies (34) and aramid belts (36, 38) are constructed as is normal for this type of tire and comprise, in carcass plies (34), 0.022 diameter nylon cord at 35 e.p.i., and a total treatment gauge of 0.028 inch: and in aramid belts (36, 38), 0.031 inch diameter aramid cords at an end count of 20 e.p.i., and a total treatment gauge of 0.044 inch.

As can be seen in FIG. 3, aquachannels (14) have generally rounded shape at the bottom of the aquachannel, and a rounded contour where the aquachannel walls meet the land areas of tread (12).

As used herein, "aquachannel" refers to an extra wide circumferential groove with rounded groove walls designed specifically to channel water out of the contact area of the footprint of the tire.

The location of the aquachannels (14) provides for a wider center rib, which helps to improve the wear performance of the tire, since the net contact area of the tread remains approximately the same as that seen in prior art tires having less void volume in the circumferential grooves. It is believed that the tire of the invention also has improved wet runway performance because the groove volume is closer to the center of the tire, as compared to prior art grooved tires, where it is more effective as a channel for water.

Each of the carcass plies (34) comprises a plurality of reinforcing elements oriented at 75° to 90° in a radial ply construction, and 30° to 50° in a bias ply tire construction, all angles with respect to an equatorial plane (EP) of the tire. As used herein and in the claims, the "equatorial plane" of a tire is a plane that is perpendicular to the axis of rotation of the tire and passes through the center of the tire tread.

The carcass plies in each illustrated embodiment comprise turn-up carcass plies (34,43). Each of the tun-up carcass plies is folded axially and radially outwardly about each of the bead cores (32,42).

For details about the possible choices of ply angles in a tire, reference is hereby made to U.S. patent application Ser. No. 156,624 (filed on Feb. 17, 1988).

Figure 4:
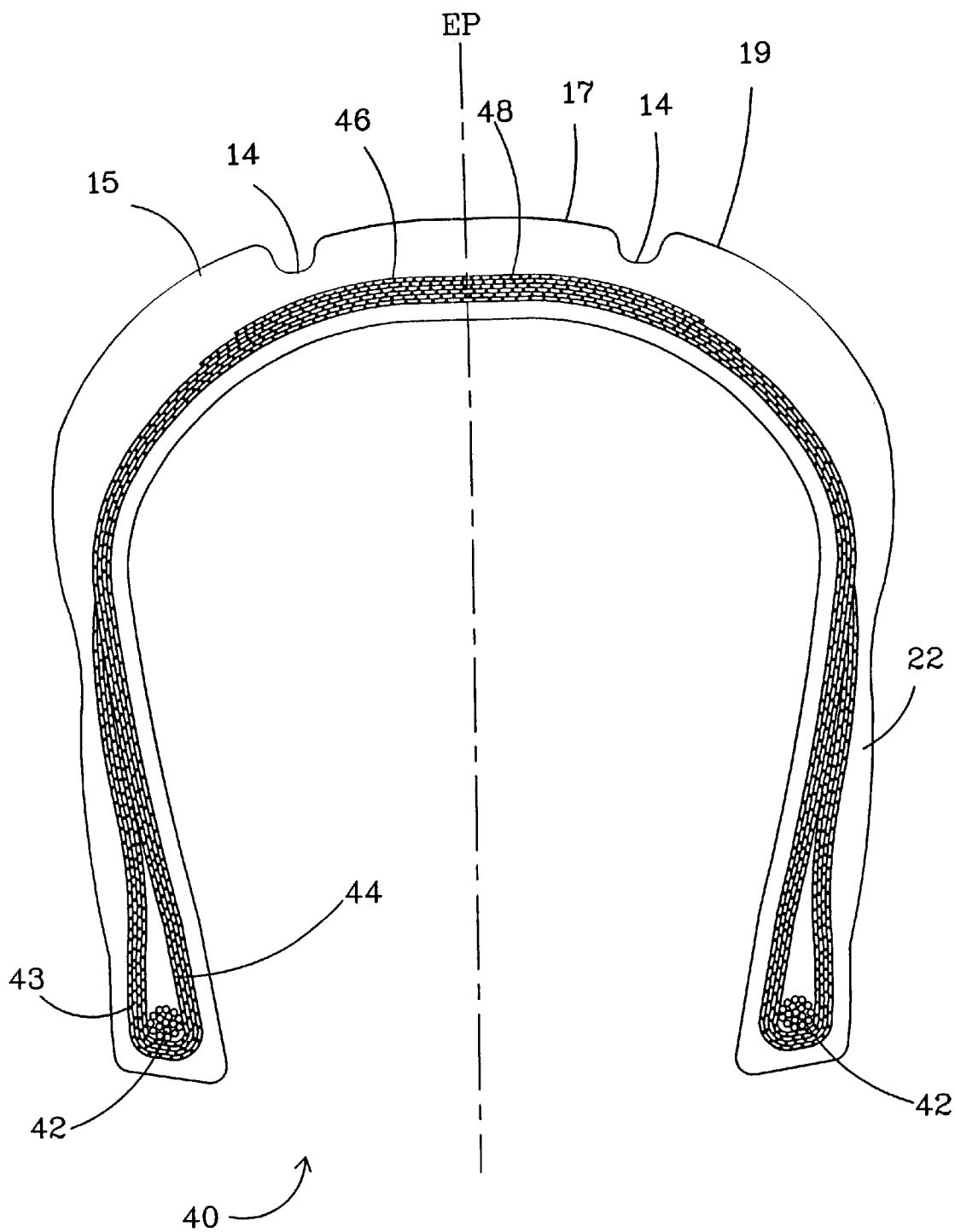
FIG. 4 illustrates a cross-section of bias carcass ply embodiment of the aircraft tire of the invention.

With reference now to FIG. 4, in the illustrated bias ply embodiment of the invention, tire (40) comprises at least one pair of beads (42) around which are wrapped carcass plies (44). High modulus belts (46,48) are disposed over the carcass plies in a crown area of the tire. The carcass plies (44) have a tun-up portion (43).

The aqua channels (14) and land areas of the tread (15,17,19) and sidewalls (22) have substantially the same shape and proportions as illustrated for the radial ply tire described for FIG. 3.

Tires as illustrated in FIG. 4, made using strap beads, a carcass construction comprising four turn-up carcass plies and two aramid belts, and a tread depth of 0.25 to 0.34 inch (depending on the size) were constructed for testing.

For the purposes of this invention, the belts are substantially two dimensional, those skilled in the art being aware that in such belts have a total belt package thickness of about 3 mm. For the tire in the illustrated embodiment of FIG. 4, the length of the plies is about 54 inches, it being understood that the length and width can vary depending on the size of the tire and the tire construction.

Aircraft tires of the kind illustrated herein are qualified by a step load test where tires at a specific load are run at various increasing speed steps up to a maximum, and under an increased load are run through the speed steps again. A tire qualifies if it finishes, intact, 61 cycles of this test at the designated loads and speeds.

The invention is further illustrated with reference to the following examples.

EXAMPLE 1

A bias ply tire, as illustrated in FIG. 4, was constructed according to the following specifications.

| TIRE DATA | | |
|---|---|---|
| Tread Design | 2 Groove, C/L Rib | |
| Wheel Rim Designation | 6.00-6 | |
| AEA Code | N04-2A F0A | |
| Load Rating | 1750 lbs | (794 kg) |
| Speed Rating | 160 mph | |
| Rated Inflation (@ 68° F.) | 42 psi | (2.9 bar) |
| Mold Code | AR-548 | |
| Mold Skid Depth: | 0.28 in | (7.1 mm) |
| Nominal Loaded Radius: & | 6.90 in | (175 mm) |
| Permissible Tolerance @ Rated Load and Inflation | +.30/−.27 in | (+7.6/−6.9 mm) |
| Max Static Unbalance | 7 in-oz | (0.05 Nm) |

EXAMPLE 2

The tires made according to the specifications described in EXAMPLE 1 were subjected to static testing according to FAA standards and requirements.

| STATIC TEST DATA | | |
|---|---|---|
| Tire Weight | 10.2 lbs | (4.6 kg) |
| Loaded Radius (@ Rated Load & Inflation) | 6.96 in. | (177 mm) |
| Dimensions (@ Rated Inflation) | | |
| Outside Diameter | 17.09 in. | (434 mm) |
| Section Width | 6.23 in. | (158 mm) |
| Shoulder Diameter @ 5.35 in. (136 mm) | 14.03 in. | (356 mm) |
| Shoulder Width @ 15.45 in. (392 mm) | 4.92 in. | (125 mm) |
| Burst Pressure (S/N 92440201) | 390 psi | (26.9 bar) |
| Unbalance | Within Limits | |
| Diffusion Rate | Tube Type | |

EXAMPLE 3

The tires as specified in EXAMPLE 1 were also subjected to dynamic testing according to FAA guidelines.

DYNAMIC TEST DATA

Tire Test Location: Goodyear Technical Center—Akron 1. 50 high speed takeoff cycles.
2. 10 taxi cycles for 25,000 ft @ 40 mph.
   A. 8 cycles @ 1750 lbs (794 kg)
   B. 2 cycles @ 2100 lbs (953 kg)
3. 1 high speed overload takeoff cycle.

The measured inflation pressure loss after completing the above testing did not exceed * % for a 24 hour period.

The above test conditions meet or exceed all requirements of the referenced specifications.

The subject tire successfully completed the testing requirements of TSO-C62d.

Tube type tire.

While the invention has been variously illustrated and described, those skilled in the art will recognize that the invention may be variously modified and practiced without departing from the spirit of the invention. The scope of the invention is limited only by the following claims.

What is claimed is:

1. A pneumatic tire comprising at least one pair of annular beads, at least one carcass ply wrapped around said beads, tread comprising a central portion and two shoulder portions disposed over said at least one carcass ply in a crown area of said tire, and sidewalls disposed between said tread and said beads; wherein said tread has a depth of 0.20 to 0.50 inch and two aquachannels each having a width comprising 4.5% to 7% of the tread width, and a depth comprising 63% to 83% of the tread depth; wherein the width of the central portion of said tread between the aquachannels comprises 90% to 110% of the total width of the two shoulder tread portions and wherein the tread is smooth except for the presence of the aquachannels.

2. The tire of claim 1 which is made with four nylon carcass plies and two aramid breakers.

3. The tire of claim 1 being size 5.00-5, 6.00-6, 15×6.0-6, 6.50-8, 6.50-10, 22×6.75-10, 7.00-6, or 8.50-10.

4. The tire of claim 1 which has load specifications and inflation specifications for use on an aircraft.

* * * * *